United States Patent
Blomgren et al.

(10) Patent No.: US 8,142,928 B2
(45) Date of Patent: Mar. 27, 2012

(54) SYSTEMS AND METHODS FOR RECHARGEABLE BATTERY COLLECTOR TAB CONFIGURATIONS AND FOIL THICKNESS

(75) Inventors: George E. Blomgren, Lakewood, OH (US); On Chang, San Jose, CA (US); Dania Ghantous, Walnut Creek, CA (US); Ou Mao, Pleasanton, CA (US)

(73) Assignee: BASVAH LLC, Woodside, CA (US)

( * ) Notice: Subject to any disclaimer, the term of this patent is extended or adjusted under 35 U.S.C. 154(b) by 74 days.

(21) Appl. No.: 12/133,195

(22) Filed: Jun. 4, 2008

(65) Prior Publication Data

US 2009/0305120 A1    Dec. 10, 2009

(51) Int. Cl.
*H01M 4/00* (2006.01)
*H01M 6/10* (2006.01)
*H01M 4/02* (2006.01)
*H01M 4/13* (2010.01)

(52) U.S. Cl. .......................................... 429/211; 429/94
(58) Field of Classification Search .................. 429/211, 429/94
See application file for complete search history.

(56) References Cited

U.S. PATENT DOCUMENTS

| | | | |
|---|---|---|---|
| 5,552,239 A | 9/1996 | Gozdz et al. | |
| 5,571,632 A | 11/1996 | Teramoto | |
| 5,587,253 A | 12/1996 | Gozdz et al. | |
| 5,693,430 A | 12/1997 | Iwatsu et al. | |
| 5,736,270 A | 4/1998 | Suzuki et al. | |
| 5,972,532 A | 10/1999 | Oweis et al. | |
| 6,040,086 A | 3/2000 | Yoshida et al. | |
| 6,106,975 A | 8/2000 | Watanabe et al. | |
| 6,235,426 B1 * | 5/2001 | Yanai et al. | 429/211 |
| 6,245,457 B1 | 6/2001 | Romero | |
| 6,245,464 B1 * | 6/2001 | Spillman et al. | 429/332 |
| 6,335,114 B1 | 1/2002 | Ueshima et al. | |
| 6,617,074 B1 | 9/2003 | Watarai et al. | |
| 6,881,514 B2 | 4/2005 | Ahn et al. | |
| 6,951,699 B2 | 10/2005 | Yata et al. | |
| 7,153,609 B2 | 12/2006 | Kubo et al. | |

(Continued)

FOREIGN PATENT DOCUMENTS

EP    0 973 221 A1    1/2000

(Continued)

OTHER PUBLICATIONS

Panasonic, Standard Lithium Ion Battery Pack, Jun. 2001, No. 1-2 (found at: http://media.digikey.com/PDF/Data%20Sheets/Panasonic%20Batteries%20PDFS/CGA-7%20102.pdf).*

(Continued)

*Primary Examiner* — Gregg Cantelmo
*Assistant Examiner* — Eugenia Wang
(74) *Attorney, Agent, or Firm* — Wilson Sonsini Goodrich & Rosati

(57) ABSTRACT

Systems and methods for configuring tabs on a rechargeable battery may include a current collector comprising one or more collector foil and one or more tabs connected to the collector foil for conveying generated current from the current collector. The tabs may be configured to extract greater capacity from the battery electrodes so that the resulting battery may exhibit higher performance. The tabs may be configured so that the length of the tab is greater than the height of the collector foil so the tab may cover the height of the collector foil and may protrude from the foil.

14 Claims, 11 Drawing Sheets

U.S. PATENT DOCUMENTS

| | | |
|---|---|---|
| 7,192,673 B1 | 3/2007 | Ikeda et al. |
| 2003/0036001 A1 | 2/2003 | James et al. |
| 2003/0099880 A1 | 5/2003 | Park et al. |
| 2004/0062991 A1 | 4/2004 | Fukui et al. |
| 2004/0072067 A1 | 4/2004 | Minami et al. |
| 2005/0014063 A1* | 1/2005 | Shi et al. ............ 429/144 |
| 2005/0053717 A1 | 3/2005 | Okada et al. |
| 2005/0123829 A1 | 6/2005 | Fukui et al. |
| 2005/0277021 A1* | 12/2005 | Kozuki et al. ............ 429/211 |
| 2006/0166093 A1 | 7/2006 | Zaghib et al. |
| 2007/0048602 A1 | 3/2007 | Kim |
| 2007/0172733 A1 | 7/2007 | Minami et al. |
| 2007/0259271 A1 | 11/2007 | Nanno et al. |
| 2007/0269685 A1 | 11/2007 | Chu et al. |

FOREIGN PATENT DOCUMENTS

| | | |
|---|---|---|
| EP | 1 065 743 A2 | 1/2001 |
| EP | 1 065 743 A3 | 6/2004 |
| JP | 2003/109668 A | 4/2003 |

OTHER PUBLICATIONS

Remiers, J. Predicting current flow in spiral wound cell geometries. Journal of Power Sources. 2006;(158):663-672.

International search report and written opinion dated Dec. 30, 2009 for PCT Application No. US2009/046206.

* cited by examiner

SYSTEMS AND METHODS FOR RECHARGEABLE BATTERY COLLECTOR TAB CONFIGURATIONS AND FOIL THICKNESS

FIELD OF THE INVENTION

The invention relates to a rechargeable galvanic cell (hereafter referred to as a cell or battery), comprising at least one positive electrode and one negative electrode. More particularly, the invention relates to configurations of collector tabs to extract more capacity from battery electrodes and thicknesses of each collector foil so that the resulting battery can exhibit high performance.

BACKGROUND OF THE INVENTION

The battery performance of rechargeable lithium batteries may depend on the characteristics of electrodes used. Battery cells have been made by bonding tabs to current collectors, such that the tabs are capable of conveying current from a current collector. Some examples of such cells may include a rectangular-shaped cell in which a plurality of rectangular-shaped electrodes are laminated or stacked; or a cylindrical-shaped cell in which band-shaped electrodes are spirally-wound. For instance, a spirally-wound lithium battery may include a positive electrode made by coating a band-shaped collector foil with a positive electrode active material, a plurality of tabs bonded to a part of the positive electrode, a separator, and a negative electrode made by coating a band-shaped negative collector foil with a negative electrode active material and a plurality of tabs superimposed on the positive electrode by way of the separator and a second separator imposed on the top of the assembly. These components may be wound integrally in a spiral manner. Tabs may be bonded to an electrode by methods such as ultrasonic welding, resistance welding, laser welding, stamping, or crimping.

Batteries have included tabs made by using a metallic foil, which has been attached to each of the positive and negative electrodes. A current could flow in each of the tabs when the small-sized battery is discharged or recharged. A tab can be attached at a leading end of a wound band-shaped electrode, at a trailing end thereof, or at a point between the leading end and trailing end thereof.

A band-shaped electrode may be formed as a long and continuous substance and has a large surface area. In such cases, sometimes a plurality of tabs have been attached over the electrodes at intervals so that the discharge and recharge take place somewhat uniformly over the entire length of the electrodes. In some cases, tabs have been aligned in the spiral, although the tightening at the center of the winding makes it difficult to align them at some portions.

A resistance exists within an electrode along the length of the electrode. If the density of a current perpendicular to the electrode were not uniform over the electrode surface, the utilization of the high current density area would be complete before that of the low current area. This may cause the effective area of the electrode to steadily decrease and impedance to rise, such that the current capability of the electrode may be diminished.

If a current collector foil is too thin, the current collector resistance along the electrode may be high. If a current collector foil is too thick, the electrode area may be small and the electrochemical resistance may be high. Increasing either current collector resistance or electrochemical resistance may cause the current capability of an electrode to diminish, and the performance of a battery to suffer.

Therefore, a need exists for a configuration of tabs and optimizing current collector thicknesses such that the current collector configurations may lead to reductions of current collector impedance while maintaining maximum uniformity of current density of the electrodes and equalizing resistance between the electrodes in order to increase the performance of the battery.

SUMMARY OF THE INVENTION

The invention provides systems and methods for configuring current collectors for rechargeable batteries. Such configurations may include tab arrangements and current collector foil thicknesses. Various aspects of the invention described herein may be applied to any of the particular applications set forth below or for any other types of batteries and electricity generator elements. The invention may be applied as a standalone system or method, or as part of an integrated battery or electricity generation system. It shall be understood that different aspects of the invention can be appreciated individually, collectively, or in combination with each other.

An aspect of the invention provides for a battery comprising at least a positive electrode and a negative electrode, each with a current collector. A current collector may have at least one tab electrically connected to the collector foil. The collector foil may have a predetermined height and thickness. The dimension of the collector foil referred to as the height may also be alternatively referred to as the width. The tab may be formed with a length so that the tab may protrude from the collector foil and may be bonded integrally with the current collector foil.

In some embodiments of the invention, a coating may be formed on the surface of the collector foil. The coating may include active materials, and may be coated on one or both surfaces of the collector foil.

In some other embodiments of the invention, the electrodes and separators may be arranged in a number of different ways. Separators may be disposed between electrodes to prevent electrodes from coming into contact with one another. For instance, the current collector assembly may be laminated so that the negative current collector surface may be flush to the positive current collector and any separators.

The collector foil of an electrode may have a number of shapes and sizes. For instance, the collector foil may be rectangular in shape and may have a particular height, length, and thickness. Similarly, the collector foil may be band-shaped (e.g., similar to a rectangle but where the length may far exceed the height and thickness). The collector foil may be made of different materials capable of conducting electrical current.

One or more tabs may be electrically connected to each of the current collector foils. The tabs may be connected by methods such as fixedly welding the tabs to the current collector foil through means such as ultrasonic welding, laser welding, or resistance welding, or by crimping the tabs onto the current collector foil. In some embodiments, the tabs may be connected near the leading end, the trailing end, or both ends of the foils. In other embodiments, the tabs may be connected to the uncoated portions of the foils. Some alternate embodiments of the invention provide for tabs made from the current collector foils themselves, such as by slitting the foils or otherwise cutting or shaping them from the foil.

In one embodiment of the invention, a tab may be connected to a current collector foil so that the tab may protrude from the current collector. In this implementation, the length of the tab may be greater than the height of the collector foil so that the tab covers the entire height of the collector. Alternatively, a tab may be connected to the current collector so that the tab may be symmetrically arranged along the center line of the current collector with respect to height. In such a case, a shorter tab can be used if it is connected symmetrically at the half height of the collector.

Tabs may be arranged at different intervals along the length of a current collector. In one embodiment of the invention, a negative electrode tab may be connected to a negative collector foil at one end and a positive electrode tab may be connected to a positive collector foil at the other end. For instance, if a negative electrode tab lies at the leading or left end of a negative foil, the positive electrode tab may lie at the trailing or right end of the positive foil.

Multiple tabs may be used along the length of the current collector foils. In one embodiment, multiple tabs may be used if they are arranged symmetrically about the center of one of the collector foils along the length direction. In one implementation, one of the collector foils may be connected to two tabs while the other collector foil may be connected to one tab. For example, two negative electrode tabs may be connected at the ends of a negative collector foil, where the ends may be defined in the longitudinal direction, and may be combined with one positive electrode tab, which may be connected at the center of a positive collector foil, where the center may be defined in the longitudinal direction.

In another implementation of the invention, one of the electrodes may have three tabs while the other electrode may have two tabs. For example, three negative electrode tabs may be connected at the ends of a negative collector foil and at the center of the negative collector foil in the long direction while two positive electrode tabs may be connected to a positive collector foil so that they are equidistant from the ends of the positive collector foil and the center of the positive collector foil.

In other implementations, any number of tabs may be used as long as they are arranged symmetrically about the center of one of the electrodes where the center is defined in the longitudinal direction. Similar to previous implementations, if one electrode has n number of tabs, the other electrode may have n−1 number of tabs arranged symmetrically about the center of the collector foils. In other implementations, the tabs may not all be arranged symmetrically about the center, and there may be some variation in tab placement.

In another embodiment, the tabs may be arranged so they are not symmetric about the center of the collector foils along the length direction. Such tabs may be arranged so that they are evenly spaced from one another. The same number of tabs may be used on each electrode. Any number of tabs n may be arranged on each electrode as long as they are symmetrically arranged in such a way that one electrode has the first tab at the leading end of the electrode, a second tab at a distance of $2*L/(2n-1)$, a third tab at $2*2L/(2n-1)$ and so forth until the number in the numerator multiplying the length is equal to $(2n-2)$. The second electrode may have tabs arranged identically from the trailing end of the electrode. For example, if each electrode has two tabs, a negative electrode tab may be connected at the leading end of the electrode and at ⅔ the length from the leading end of the negative electrode, and a positive electrode tab may be connected at the trailing end of the positive electrode and at ⅔ the length from the trailing end of the positive electrode. This arrangement may assure that the projection of the counter electrode on a given electrode falls exactly at the midpoint of two adjacent tabs of the given electrode so the current collection is symmetrical.

In accordance with one embodiment of the invention, the tabs protruding from the collector foils may protrude on opposite directions along the foils. For example, the tabs may be arranged so that all of the negative electrode tabs may point downwards along the height of the collector foil, while all of the positive electrode tabs may point upwards along the height of the collector foil. Alternatively, all of the tabs protruding from the collector foils may protrude in the same direction along the foils. For example, all of the tabs, including the negative and positive electrode tabs may point upwards along the height of the current collector foils. In yet another embodiment of the invention, the tabs may protrude from the collector foils in any combination of different directions. For example, the tabs may be arranged so that some of the negative electrode tabs may point upwards and some may point downwards, and that some of the positive electrode tabs may point upwards and some may point downwards.

In some embodiments of the invention, a battery may be formed with a plurality of current collectors that are arranged in a stack. In some other embodiments, a band-shaped current collector can be spirally wound so that the side of the band-shaped electricity collector may result in a flush wound end surface, such as a jellyroll configuration to form a battery.

The positive and negative current collector foils may be selected such that the positive collector foil has a predetermined thickness and the negative collector foil has a predetermined thickness. The positive and negative collector foils may be formed with the predetermined thicknesses. A predetermined cell resistance of the current collector may be provided as a function of the predetermined thicknesses of the positive and negative collector foils. In one implementation, the predetermined resistance may be the sum of a current collector resistance and an electrochemical resistance.

If a collector foil is too thin, the current collector resistance along the current collector may be high. If a collector foil is too thick, a smaller length of the collector foil may fit within a given volume such as a cell can, and the electrode area may be small and the electrochemical resistance may be high. Increasing either current collector resistance or electrochemical resistance may cause the current capability of an electrode to diminish, and the performance of a battery to suffer. As such, optimal thicknesses may exist to minimize cell resistance.

One aspect of the invention may provide forming a battery with a cell resistance by selecting a positive collector foil with a first thickness and selecting a negative collector foil with a second thickness, where the first and second thicknesses of the positive and negative collector foils may be selected from a predetermined range to provide a customized total cell resistance for the battery. In some embodiments, the positive and negative collector foils may be selected with a first thickness and a second thickness respectively such that the positive and negative electrodes have the same current collector resistance.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

Incorporation by Reference

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The features and advantages of the invention may be further explained by reference to the following detailed description and accompanying drawings that sets forth illustrative embodiments.

DETAILED DESCRIPTION OF THE INVENTION

Figure 1:
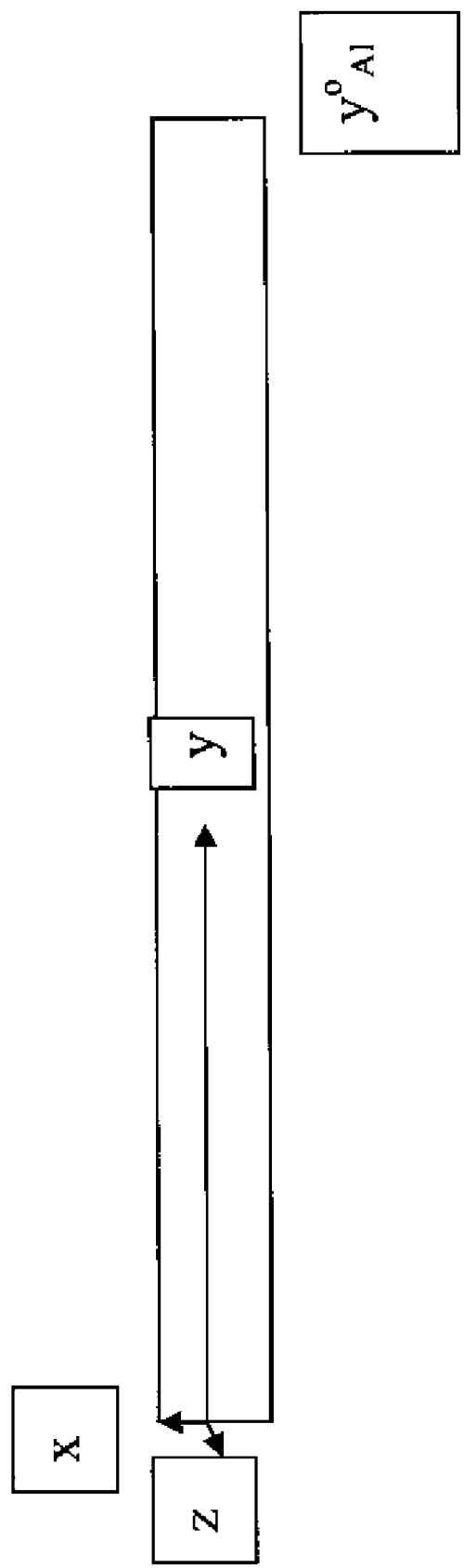
FIG. 1 defines a set of coordinates for a collector foil.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

An embodiment of a galvanic cell (which may also be referred to herein as a battery or cell) in accordance with the invention can comprise the following components: one or more positive electrodes and one or more negative electrodes, and one or more separators to separate the electrodes. Each electrode may consist of a current collector foil piece with a coating comprising an active material. The current collector foil pieces may include one or more tabs attached to it. The tabs may be connected to collector foils in various configurations and the components may be combined to form a battery.

The various components of a battery can be made of different materials known in the art or later developed. In accordance with various embodiments, the collector foils of an electrode, the tabs of an electrode, the coating including active material which may be applied to the collector foil, and the separators can comprise different materials.

In some embodiments of the invention, the collector foil may be made of materials capable of conducting electrical current, such as a metallic foil. For example, the metallic foil can be made from a material, such as copper, aluminum, nickel, titanium, or stainless steel. In some embodiments of the invention, the negative and positive collector foils may be made of different materials. For example, a negative collector foil may be formed with copper and a positive collector foil may be formed of aluminum. Alternatively, the negative and positive collector foils may be made of the same material.

The tab for the positive or negative electrode can be made of the same metallic foil as that of the collector foil for the positive or negative electrode, respectively and be electrically connected to the collector foil. In some embodiments, the tab may be part of the same metallic foil of the collector foil itself. Alternatively, the tab can be made of a different metallic foil. Materials for the tabs may include metallic foils such as a copper, aluminum, nickel, titanium, or stainless steel. In some embodiments of the invention, the tabs may be formed of different materials from one another.

In some embodiments of the invention, a coating comprising an active material may be formed on the surface of a collector foil. The coating may be coated on the front surface of a collector foil, the back surface of the collector foil, or both surfaces of the collector foil. The coating including the active material may cover a part of the surface or the entire surface of the foil. The coating may continuously or non-continuously cover parts of the surface of the collector foil. The current collector coating may include active materials that may enable current flow.

For example, a positive collector foil may be covered with a coating including an active material such as lithium-based oxide, a binder, and a conductive material. In some embodiments, the coating for the positive electrode can be a mixture of a powder of lithium transition metal oxide, a conductive powder, and a binder agent. The lithium transition metal oxide can be materials such as lithium cobalt oxide ($LiCoO_2$), lithium nickel oxide ($LiNiO_2$), lithium manganese oxide ($LiMn_2O_4$), or a material wherein other elements, preferably lithium, magnesium, aluminum, or other group 3d or 4d transition element may be added to or partially substituted for the crystal of the active material. The binder may not be particularly limited. Several examples of binders may include polytetrafluoroethylene (PTFE), polyvinylidene fluoride (PVDF), or a non-fluorinated binder, such as ethylene-propylene-diene copolymer (EPDM), styrene-butadiene rubber (SBR), and carboxymethyleellulose (CMC). Preferable conductive agents usable may include carbon black, acetylene black, KETJEN BLACK, Super-P, PureBlack, natural graphite, synthetic graphite, or expanded graphite. In some embodiments, the conductive agents may be a blend of the above. In some embodiments, the mixture can be turned into a slurry, and the positive collector foil can be coated with the slurry.

A negative collector foil may be covered with a coating including an active material selected from the group consisting of carbon material, and a binder. However, it may be understood that such materials coated on the collector foil may include other materials known or later developed. In some embodiments, the coating for the negative electrode can be a mixture of a powder of carbon and a binder agent. The active material may include a material which can occlude and devolatilize lithium ions, for example, carbonaceous materials or chalcogen compounds, and those formed of a light metal. For example, such carbonaceous materials may include coke, carbon fibers, pyrolysis vapor growth carbonaceous materials, graphite, resin sintered products, and mesophase pitch carbon fiber or mesophase spherical carbon sintered products. Chalcogen compounds may include titanium disulfide ($TiS_2$), molybdenum disulfide ($MOS_2$), niobium selenide ($NbSe_2$), or transition metal oxides of low valence such as CoO. Examples of preferred light metals may include aluminum, aluminum alloys, magnesium, magnesium alloys, silicon, silicon alloys, tin and tin alloys, lithium metal, and lithium alloys. The binders may include, for example, polytetrafluoroethylene (PTFE), polyvinylidene fluoride (PVDF), ethylene-propylene-diene copolymer (EPDM), styrene-butadiene rubber (SBR), and carboxymethylcellulose (CMC). The mixture can be turned into a slurry, and the negative collector foil can be coated with the slurry.

A coating including an active material may be applied to a collector foil. The coated collector foil may be dried, in some embodiments by applying heat or IR.

The positive and negative collector foils may have coatings applied and processed on them such that the positive and negative electrodes may have various porosities. The positive and negative electrodes may have a porosity from approximately 5% to 80%. For example, the positive and negative electrodes may be approximately 5% porosity, 10% porosity, 20% porosity, 30% porosity, 40% porosity, 60% porosity, or 80% porosity. In some embodiments, the positive and negative electrodes may have different porosities. For example, a positive electrode may have a 40% porosity, while a negative electrode may have a 45% porosity. In alternate embodiments, the positive and negative electrodes may have the same porosity.

The positive and negative electrodes may also include a coating including an active material applied and processed on them such that the positive and negative electrodes may have various loading values. For example, a positive electrode may have an approximately 15 mg/cm$^2$ loading while a negative electrode may have an approximately 6.9 mg/cm$^2$ loading. Alternatively, the positive and negative electrodes may have the same loading value.

In some other embodiments of the invention, a battery may also comprise separators, and electrodes and separators may be arranged in a number of different ways. The electrodes may be separated by one or more separators between them so that the separators may be disposed between a positive electrode and a negative electrode. In some embodiments, one or more separators may be disposed adjacent to a positive electrode or negative electrode.

The separators may be made of a material that may separate the electrodes while allowing ions to pass through. For example, the separator may be a very thin sheet of microporous plastic. Alternatively, the separator may be formed of a material, which may be impregnatable with an electrolyte and may be permeable to lithium ions, such as a nonwoven fabric of a synthetic resin, a porous film of polyethylene, a porous film of polypropylene, or polyether of the PEO-PPO copolymer type of the 3 branch or 4 branch type. A separator may be prepared by being cross-linked by thermal heating, E-Beam, IR, or UV.

In one example, a battery may be prepared by taking dried positive and negative electrodes so they face one another through a separator, layering an additional separator, winding them into a roll, inserting the roll into a battery casing, and adding an electrolyte.

FIG. 1 defines a set of coordinates for a current collector. In accordance with one embodiment of the invention, a current collector may have a height, length, and thickness. The current collector may have a set of coordinates such that the x-axis defines the height, the y-axis defines the length, and the z-axis defines the thickness of the foil. The dimension defined by the x-axis may referred to as the height, or alternatively, as the width of the current collector.

The current collector may have a number of shapes and sizes. For instance, the current collector foil may be rectangular in shape and with a particular height, length, and thickness. Similarly, the current collector foil may be band-shaped, which may be similar to a rectangle where the length far exceeds the height and thickness. Alternatively, the current collector foil may have any shape or configuration that may allow it to function within a battery. Current collector foils may be selected with predetermined thicknesses that may enable a battery to exhibit a higher performance. Current collector foil thicknesses may be discussed further below.

One or more tabs may be electrically connected to the current collectors. The tabs may also be of various shapes or sizes. In one embodiment of the invention, the tabs may be comprised of rectangular strips.

The tabs may be connected by methods such as fixedly welding the tabs to the current collector foil through means such as ultrasonic welding, resistance welding, or laser welding. An ultrasonic process may be advantageous because it may be less likely to cause thermal influence. It may also enlarge the bonding area and reduce contact resistance. Alternatively, the tabs may be connected to the current collector foils by crimping the tabs onto the current collector foil or by taping the tabs to the current collector foil. Some alternate embodiments of the invention provide for tabs made from the current collector foils themselves, such as by slitting and folding the foils or otherwise cutting or shaping them from the foil.

In some embodiments, the tabs may be connected to the front surface or rear surface of the current collector foils. In other embodiments the tabs may be connected at the ends of the foils. In some alternate embodiments, the tabs may be embedded within the foil or may be connected through the foil so parts of the tabs may be connected at the front surface and part may be connected at the rear surface.

In other embodiments, the tabs may be connected to the non-coated portions of the current collector foils, which may be a portion of the electrode which is not coated with an active material. A collector foil may be provided with a non-coated portion on a side, and the tabs may be attached to the non-coated portion. The non-coated portion may be prepared in advance in a coating process for the coating including the active materials. Alternatively, the tabs can be bonded to the collector foil from above the coating, although such an operation may generate dust, and may result in a decreased bonding strength between the tab and the foil.

One or more tabs may be connected to a current collector foil in order to minimize undesirable current collector resistance. For high power batteries, collector foil conductance may be significant at high rates of discharge, which may result in significant foil conductance contribution to high power batteries to improve battery performance. In an optimum situation, the current may be uniform across the entire length of the collector, which could result in the most capacity being extracted from the electrode. The current density of the collector foil may depend on the configuration of the tabs disposed on the electrode.

For example, a positive collector foil may have length $y°_{A1}$ and a positive tab may be connected at $y=y°_{A1}$ and may extend the entire height of the foil, which may cause the system to be symmetrical about the x-axis. A negative electrode may lie over the positive electrode and may extend beyond the positive electrode a small amount in all directions. The negative electrode tab may lie at the left end of the negative collector foil at y=0.

The system may be analyzed as follows. A generalized Ohm's law can be written:

$$\Delta V = Z_{EC} * I(y)/A + \Delta V_{coll} \quad [1]$$

Where $\Delta V$ is the total voltage drop and $Z_{EC}$ is the electrochemical impedance of a surface element which includes the ohmic terms due to the negative and positive collector foil coatings and electrolyte path, the kinetic impedance due to the two electrode reactions, and the diffusive impedance due to lithium ion diffusion in the particles of active material and the electrolyte. I(y) may be the local current which may depend on the position y on the collector. $\Delta V_{coll}$ is the voltage drop due to the two collector foils at the point y.

The voltage drop due to collector foils can be expressed by Ohm's law in two terms (one for each collector) where the electrons flow from the positive electrode tab at point $y = y^o_{Al}$ to the point y and then to the negative electrode tab at point y=0:

$$\Delta V_{coll} = I * \{(y^o_{Al} - y) * \rho_{Al}/(x^o_{Al} * z^o_{Al}) + \rho_{Cu} * y/(x^o_{Cu} * z^o_{Cu})\} \quad [2]$$

This expression can be rewritten as:

$$\Delta V_{coll} = I * \{1 - y') + \lambda * y'\} * R_{Al} \quad [3]$$

where:

$$\lambda = (\rho_{Cu} * x^o_{Al} * z_{Al})/(\rho_{Al} * x^o_{Cu} * z^o_{Cu})$$

$$y' = y/y^o_{Al}$$

$$R_{Al} = \rho_{Al} * y^o_{Al}/(x^o_{Al} * z_{Al}) \quad [4]$$

$R_{Al}$ may be the resistance of the positive foil along the entire length of the foil and y' may be a dimensionless length along the foil. When the dimensionless parameter $\lambda$ is equal to 1, the expression within the curly brackets in equation [3] may be independent of the value of y' and the current may therefore be as uniform as possible across the entire length of the collector, which would be an optimum case, especially for high currents since the most capacity can be extracted from the electrode. This can be controlled by the ratio of the positive electrode to negative electrode foil thicknesses when the heights of the two electrodes are fixed and can be expressed by the following:

$$z^o_{Al} = z^o_{Cu} * (\rho_{Al} * x^o_{Cu})/(\rho_{Cu} * x^o_{Al}) \quad [5]$$

where $z^o_{Al}$ is the thickness of the positive collector foil, $z^o_{Cu}$ is the thickness of the negative collector foil, $\rho_{Al}$ is the resistivity of the positive collector foil material, $\rho_{Cu}$ is the resistivity of the negative collector foil material, $x^o_{Cu}$ is the height of the negative electrode, and $x^o_{Al}$ is the height of the positive electrode.

In some embodiments, the value of $\lambda$ may be 0.1, 0.2, 0.5, 0.79, 0.85, 0.95, 0.99, 1.0, 1.01, 1.1, 1.2, 1.5, 2, 5, or 10. The value of $R_{Al}$ may be 0.001, 0.005, 0.01, 0.0127, or 0.05 ohms. The value of $\Delta V$ may be 0.01, 0.03, 0.061, 0.08, 0.1, 0.2, 0.5 V. The value of $Z_{EC}/A$ may be 0.01, 0.02, 0.0493, 0.08, 0.1, 0.2, 0.5 ohms. Such values may be taken from the measured total polarization (at 10 s) for pulse 4 and deducting the collector resistance.

A tab may be connected to a current collector foil so that the tab may protrude from the current collector. In one implementation, a tab may be connected to the collector foil so that the length of the tab may be parallel to the x-axis, which may result in the length of the tab being orthogonal to the length of the collector foil. In this implementation, the length of the tab may be greater than the height of the collector foil so that the tab may cover the entire height of the collector foil, and may protrude beyond the height of the collector foil.

In one implementation, the tab may protrude beyond the height of the collector foil so that it only protrudes on one side. For example, if the collector foil was 2 cm in height, and the tab was 3 cm in length, 2 cm of the length of the tab may cover the collector foil and 1 cm of the tab may protrude from the collector foil, whether that 1 cm of the tab may be protruding in the upward direction or the downward direction along the x-axis.

In an alternate implementation, the tab may protrude beyond the height of the collector foil so that it may protrude on two sides. For example, if the collector foil was 2 cm in height, and the tab was 3 cm in length, 2 cm of the length of the tab may cover the collector foil and 1 cm of the tab may protrude from the collector foil, such that 0.5 cm of the tab may be protruding in the upward direction and 0.5 cm of the tab may be protruding in the downward direction along the x-axis. Alternatively, the tab may not have to protrude in a symmetrical amount, so for example, 0.25 cm of the tab may be protruding in the upward direction while 0.75 cm of the tab may be protruding in the downward direction along the x-axis.

In an alternate embodiment of the invention, a tab may be connected to the current collector foil so that the tab may be symmetrically arranged along the center line of the foil with respect to height. In such a case, a shorter tab can be used if it is connected symmetrically at the half height of the collector. A tab of any length may be used as long as it is symmetric about the y-axis of the collector foil. For example, if the collector foil was 2 cm in height, and the tab was 1 cm in length, the tab may be attached to the foil so that it is symmetric about the y-axis, so that 0.5 cm of foil could be beyond the tab at either end.

Tabs on the end of a collector foil may not preserve this symmetry if they are on the same side of a negative and positive electrode, or if they are on opposing sides of the electrodes. For example, if a tab is on top of one electrode, and a tab is on the bottom of the other electrode, symmetry may not be preserved. This may result in an increase in the current collector resistance in the x direction.

In an alternate embodiment of the invention, the tabs may be connected to the current collector so that they are at some angle to the x-axis. For instance, the tabs may comprise of strips connected to the current collector so they run 10 degrees from the x-axis. Alternatively, the tabs may not be straight themselves. For example, a portion of the tab connected to the collector foil may be parallel to the x-axis but the portion of the tab protruding from the collector foil may be oriented at some angle to the x-axis. In some implementations, within an assembled battery cell, the tab may be bent or curved, such as when the cell is assembled. Any of the embodiments of the invention may be applied with tabs that may not be completely orthogonal.

In some embodiments of the invention, the lengths of any tabs may all be the same. In alternate embodiments of the invention, the lengths of the tabs may vary, even if the tabs may be connected to the same foil.

Figure 2:
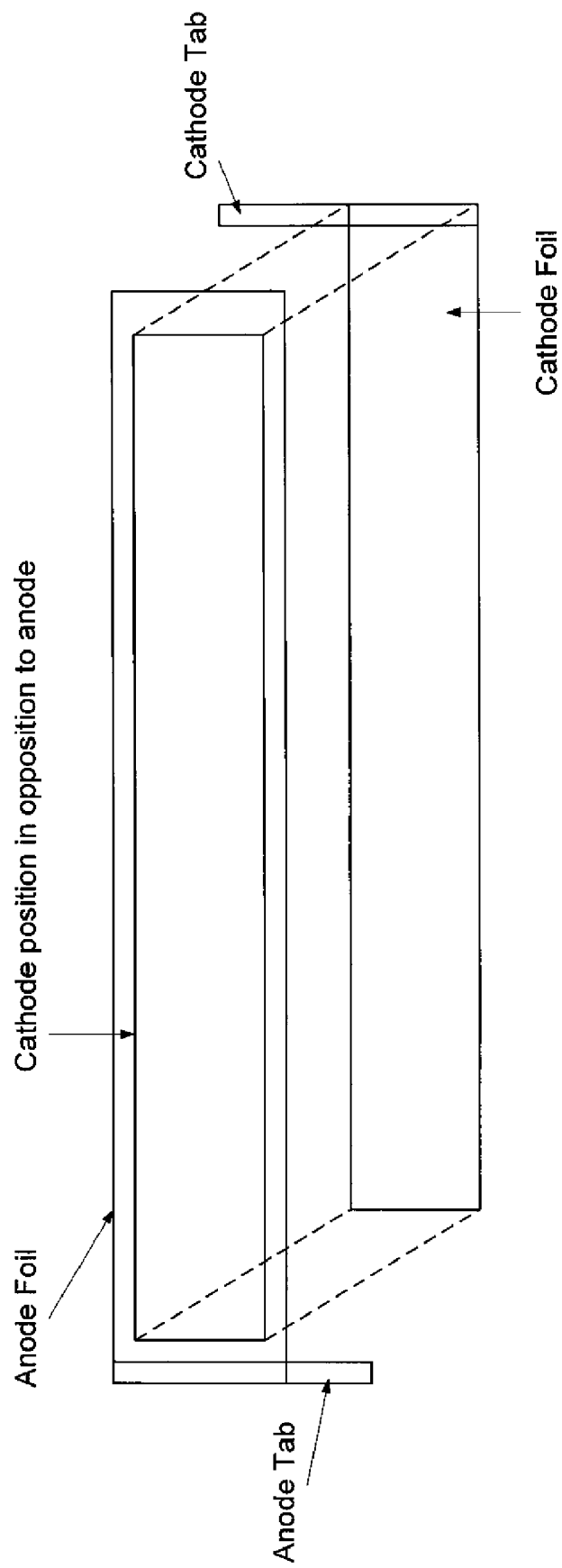
FIG. 2 shows a battery including a pair of collector foils and a pair of tabs connected to the foils.

FIG. 2 shows a battery including a pair of collector foils and a pair of tabs connected to the foils in accordance with one embodiment of the invention. Tabs may be arranged at different intervals along the length of a current collector. In some embodiments of the invention, one tab may be connected to one collector foil.

In one embodiment of the invention, a negative electrode tab may be connected to a negative foil at one end and a positive electrode tab may be connected to a positive foil at the other end. For instance, if a negative electrode tab lies at the leading or left end of a negative foil, the positive electrode tab may lie at the trailing or right end of the positive foil. Alternatively, if a negative electrode tab is attached to a negative foil at the trailing or right end, a positive electrode tab may be connected to the positive foil at the leading or left end. In an alternate embodiment of the invention, tabs may be connected to the same side of the foil. For example, both a negative electrode tab and a positive electrode tab may be connected to the leading or left end of the negative foil and positive foil respectively.

In accordance with another embodiment of the invention, the tabs protruding from the collector foils may protrude on opposite directions along different foils. For example, the tabs may be arranged so that all of the negative electrode tabs may point downwards along the x-axis of the collector foil, while all of the positive electrode tabs may point upwards along the x-axis of the collector foil. In another example, the tabs may be arranged so that all of the negative electrode tabs may point upwards along the x-axis of the collector foil, while all of the positive electrode tabs may point downwards along the x-axis of the collector foil.

Alternatively, all of the tabs protruding from the collector foils may protrude in the same direction along the foils. For example, all of the tabs, including the negative and positive electrode tabs may point upwards along the x-axis of the current collector foils. Similarly, all of the tabs, including the negative and positive electrode tabs may point downwards along the x-axis of the current collector foils In yet another embodiment of the invention, the tabs may protrude from the collector foils in any combination of different directions. For example, the tabs may be arranged so that some of the negative electrode tabs may point upwards and some may point downwards, and that some of the positive electrode tabs may point upwards and some may point downwards.

In one embodiment of the invention, a negative electrode tab may be connected to a negative electrode at one end and a positive electrode tab may be connected to a positive electrode at the other end such that the negative electrode tab protrudes in one direction along the x-axis of the electrode and the positive electrode tab protrudes in the other direction along the x-axis of the electrode. For example, as shown in FIG. 2, an anode tab may be connected at the left end of the anode and may be pointing downwards, while a cathode tab may be connected at the night end of a cathode and may be pointing upwards.

Figure 3:
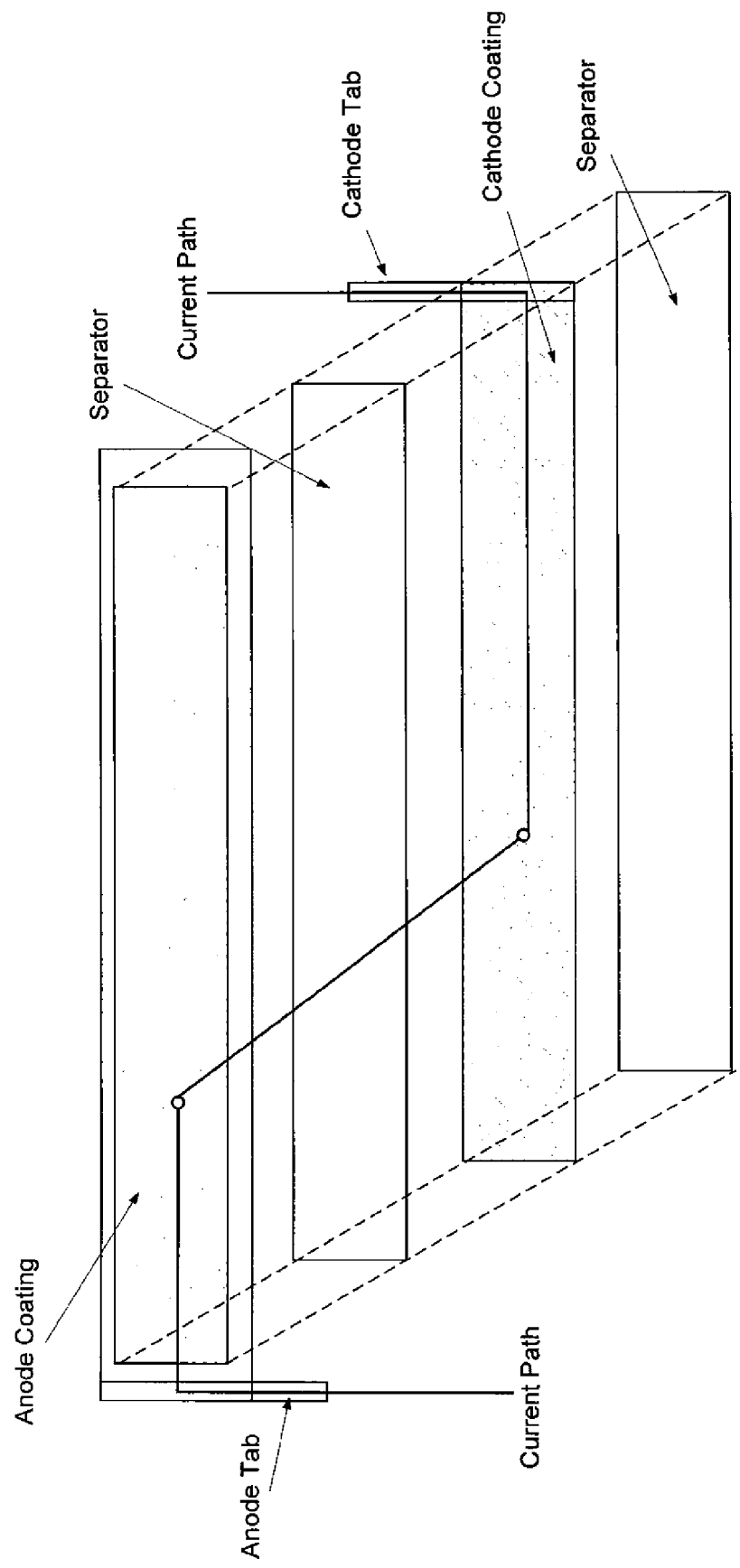
FIG. 3 shows a battery including a pair of collector foils, a pair of tabs connected to the collector foils, and separators separating the collector foils.

FIG. 3 shows a battery including a pair of collector foils, a pair of tabs connected to the collector foils, and separators separating the collector foils in accordance with one embodiment of the invention.

The electrodes may be separated by one or more separators between the electrodes so that the separators may be disposed between a positive collector foil and a negative collector foil. In some embodiments, one or more separators may be disposed adjacent to a positive collector foil or negative collector foil. For instance, FIG. 3 illustrates an anode tab connected to an anode collector foil with a coating, which is adjacent to a separator, which is also adjacent to a cathode collector foil with a cathode tab, which is also adjacent to another separator.

The separators may be of a size and shape to prevent the positive electrode and negative electrode from coming into contact with one another. For example, in a situation where the electrodes are rectangular in shape, the separators may also be rectangular in shape of sufficient dimensions to keep the electrodes from coming into contact with one another. In another example, in a situation where the electrodes are a band shape, the separators may also be a band shape of sufficient dimensions to keep the electrodes from coming into contact. The separators may be made of a material that may separate the electrodes while allowing ions to pass through. The separators may be impregnated with an electrolyte which may be permeable to ions, such as lithium ions.

In one embodiment of the invention, a current path may be such that a current may flow from one tab through a connected collector foil, then through a separator, then through the other collector foil to the other tab. The direction of flow may depend on whether a battery is charging or discharging. For instance, while a battery is charging, the current may flow in through the positive electrode tab, causing positive ions on the positive electrode to move through the separator to the negative electrode, which may further cause the current to flow through the negative electrode tab, as the electrons flow in the opposite direction. While the battery is discharging, the current may flow in the opposite direction, so the current may flow in through the negative electrode tab, into the negative electrode, causing positive ions to flow through the separator to the positive electrode, which may further cause the current to flow through the positive electrode tab as the electrons flow in the opposite direction. In some embodiments of the invention, the positive ions may be lithium ions.

Figure 4:
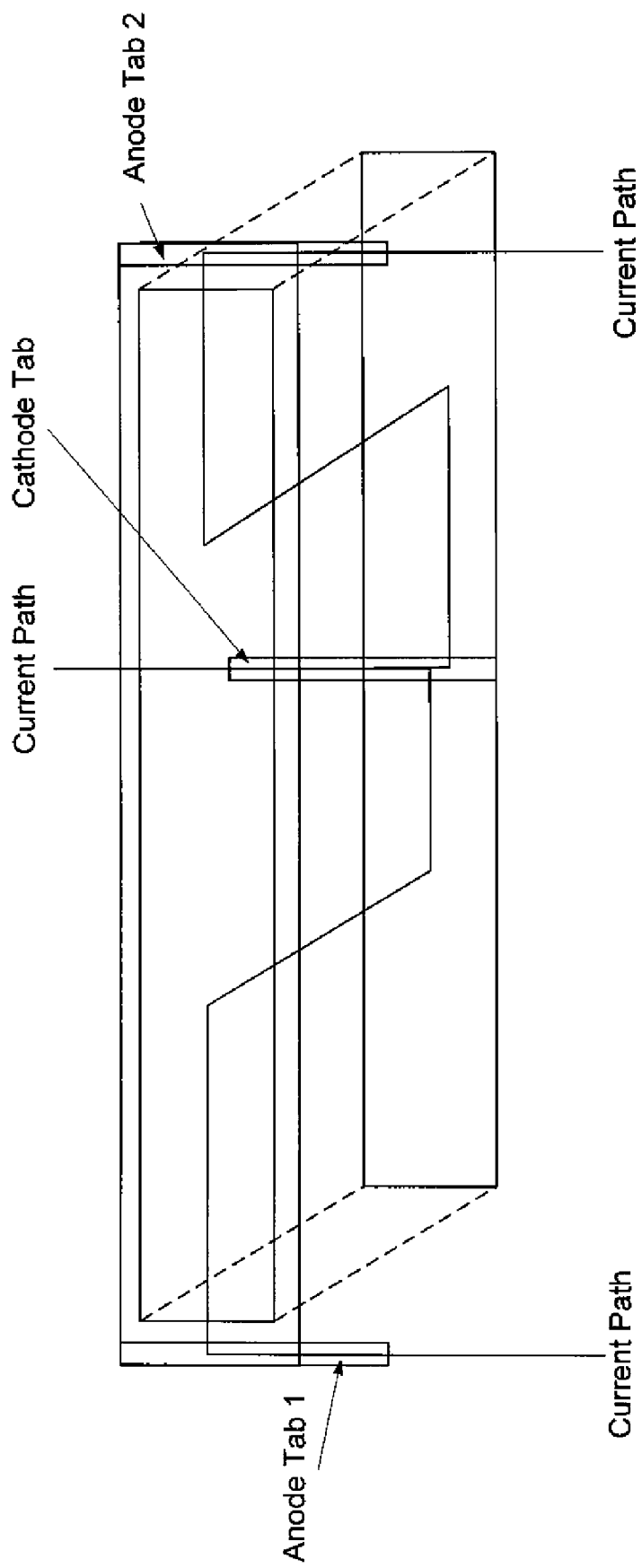
FIG. 4 shows a secondary battery including a pair of current collector foils, where two tabs are connected to one of the current collector foils, and one tab is connected to the other current collector foil.

FIG. 4 shows a secondary battery including a pair of electrodes, where one of the electrodes has two tabs, and the other electrode has one in accordance with one embodiment of the invention.

One or more tabs may be connected to an electrode in order to minimize undesirable current collector resistance. In an optimum situation, the current may be uniform across the entire length of the electrode, which could result in the most capacity being extracted from the electrode. The current density of the current collector may depend on the configuration of the tabs disposed on the electrode. Multiple tabs may be used if they are arranged symmetrically about the center of the electrode on the longitudinal direction (along the y-axis). Thus, multiple tabs may be used along the length of the electrodes.

In one embodiment, multiple tabs may be arranged symmetrically about the center of one of the electrodes along the longitudinal direction. For example, one of the electrodes may have two tabs while the other electrode may have one tab. For example, two negative electrode tabs may be connected at the ends of a negative electrode, where the ends are defined in the y-axis direction. This arrangement may be combined with one positive electrode tab connected at the center of a positive electrode, where the center is defined in the y-axis direction. Alternatively, two positive electrode tabs may be connected at the ends of a positive electrode while one negative electrode tab may be connected at the center of a negative electrode.

In one implementation, two negative electrode tabs may be connected at the ends of a negative electrode along the y-direction so that the two negative electrode tabs protrude downwards along the x-direction while one positive electrode tab may be connected at the center of a positive electrode along the y-direction so that the positive electrode tab may point upwards along the x-direction.

In one embodiment of the invention, a current path may be such that a current may flow from one tab through the connected electrode, then through a separator, then through the other electrode to the another tab of the other electrode. When there are multiple tabs, a current may flow from the tabs of one electrode to the collector foil, then through a separator, then through the other electrode to the other tabs of the other electrode.

The direction of flow may depend on whether a battery is charging or discharging. For instance, while a battery is charging, the current may flow in through the positive electrode tab, causing positive ions on the positive electrode to move through the separator to the negative electrode, which may further cause the current to flow through the negative electrode to the two negative electrode tabs at either end, as the electrons flow in the opposite direction. While the battery is discharging, the current may flow in the opposite direction, so the current may flow in through the negative electrode tabs at both ends of the negative electrode, into the negative electrode, causing positive ions to flow through the separator to the positive electrode, which may further cause the current to flow through the positive electrode to the positive electrode tab located at the center of the electrode as the electrons flow in the opposite direction.

Figure 5:
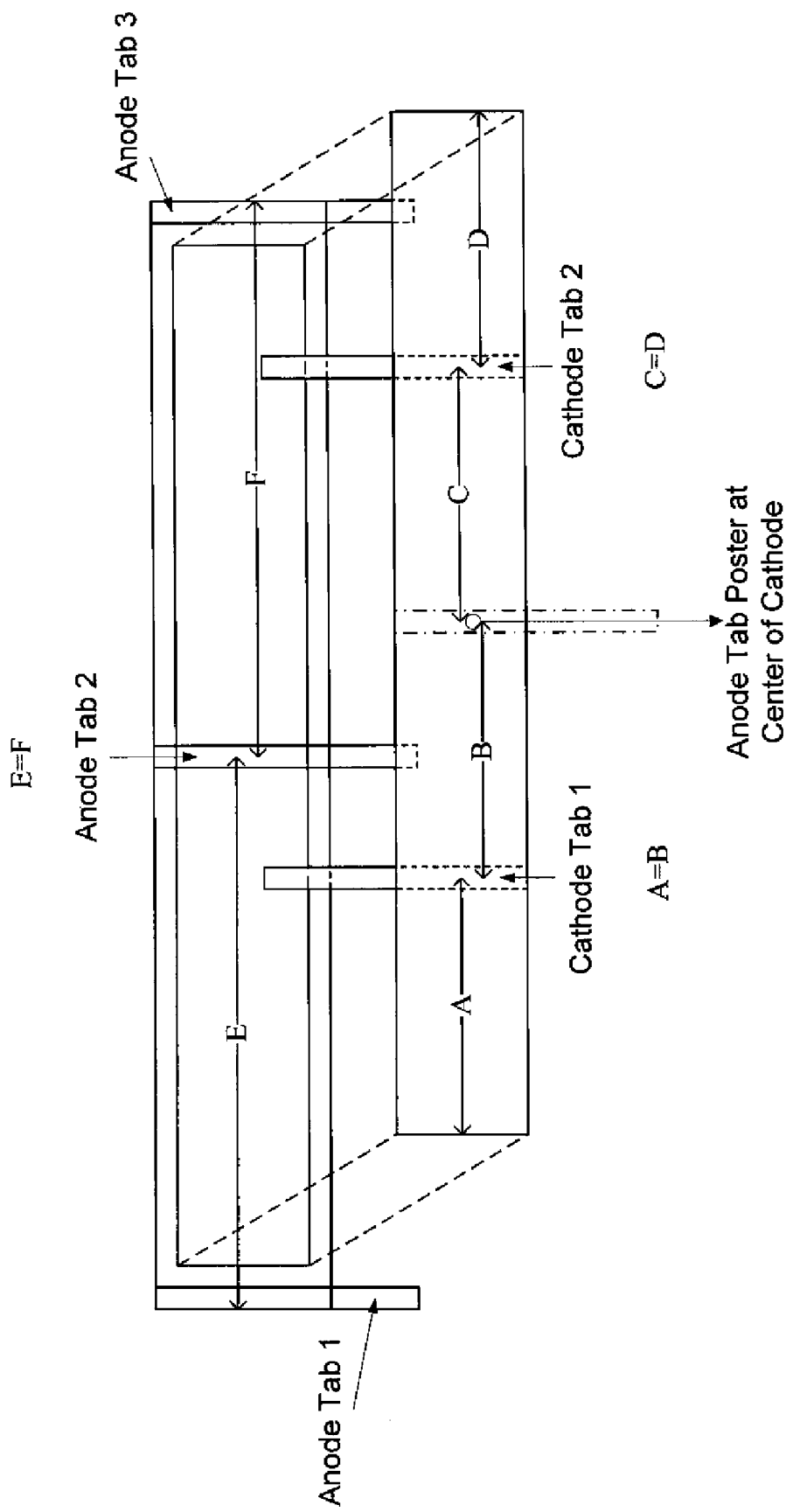
FIG. 5 shows a secondary battery including a pair of current collector foils, where three tabs are connected to one of the current collector foils, and two tabs are connected to the other current collector foil.

FIG. 5 shows a secondary battery including a pair of electrodes, where three tabs are connected to one of the electrodes, and two tabs are connected to the other electrode in accordance with another embodiment of the invention. For example, three negative electrode tabs may be connected at the ends of a negative electrode and at the center of the negative electrode while two positive electrode tabs may be connected to a positive electrode so that they are equidistant from the ends of the positive electrode and the center of the positive electrode. Alternatively, three positive electrode tabs may be connected at the ends of a positive electrode and at the center of the positive electrode in the long direction while two negative electrode tabs may be connected to a negative electrode so that they are equidistant from the ends of the negative electrode and the center of the negative electrode.

In one implementation, three anode tabs may be connected at the ends of an anode collector foil along the y-direction so that the three anode tabs protrude downwards along the x-direction while two cathode tabs may be connected at to a cathode so that they are equidistant from the ends of the cathode collector and the center of the cathode along the y-direction so that the cathode tabs may point upwards along the x-direction. The distances may be such that the cathode tabs can be arranged so that A=B=C=D, and the anode tabs can be arranged so that E=F.

In other embodiments of the invention, any number of tabs may be used as long as they are arranged symmetrically about the center of one of the electrodes along the length direction. Similar arrangements with more tabs may lead to further reductions of current collector impedance while maintaining a substantially uniform current density for the electrodes.

Similar to previous implementations, if one electrode has n number of tabs where n is any integer greater than 1, the other electrode may have n−1 number of tabs arranged symmetrically about the center of the electrodes along the length direction. Thus, similar to the previous implementations, a pair of electrodes may be connected to five tabs and four tabs respectively, nine tabs and eight tabs respectively, fifteen tabs and fourteen tabs respectively, twenty tabs and nineteen tabs respectively, thirty tabs and twenty nine tabs respectively, or fifty and forty nine tabs respectively.

Such multiple tabs may be arranged symmetrically along the y-axis. In some embodiments, the tabs connected to a first electrode may be positioned opposite from and in between the tabs electrically connected to the second electrode. In some embodiments, the tabs on the first electrode may be in between the tabs connected to the second electrode so that they are equidistant from the closest tabs on the other electrode.

In some alternate embodiments, the tabbing positions may be modified some amount so that they are not arranged symmetrically along the y-axis. The tabbing positions may be modified because of the asymmetry of the inner and outer wraps of a jellyroll. The tabbing positions may be modified in such a way that there may be equal electrode stacks in between tabs. The method of choosing tabbing position may be affected by the thickness of the electrodes and separators. For instance, the tabbing position may be chosen so that after winding, the tabs may be located at the same sector of the circumference of the jellyroll.

In another embodiment of the invention, the first current collector and the second current collector may be connected to n number of tabs where n is any integer greater than zero. The tabs on the first and second electrodes may be attached so that they are evenly spaced out. The electrodes may have a leading end and a trailing end, where the leading end and the trailing end are at opposite ends of the electrodes. For example, the first electrode of length L may have a tab connected to it at the leading end of the electrode. A second tab may be connected to the first electrode at a distance of $2*L/(2n-1)$. A third tab may be connected to the first electrode at a distance of $2*(2*L/(2n-1))$, and so forth. So where p is the tab number from 1 to n, the pth tab may be placed at $2*(p-1)*L/(2n-1)$ from the leading end of the first electrode.

Tabs may be arranged on the second electrode so they are arranged identically from the trailing end of the electrode. So the pth tab of the second electrode may be placed at $2*(p-1)*L/(2n-1)$ from the trailing end of the second electrode. Another way to view the tab arrangement of the second electrode may be that the pth tab may be placed at $(2*p-1)*L/(2n-1)$ from the leading end of the second electrode. Thus, tabs may be alternatingly evenly spaced between the first and second electrodes.

Figure 6:
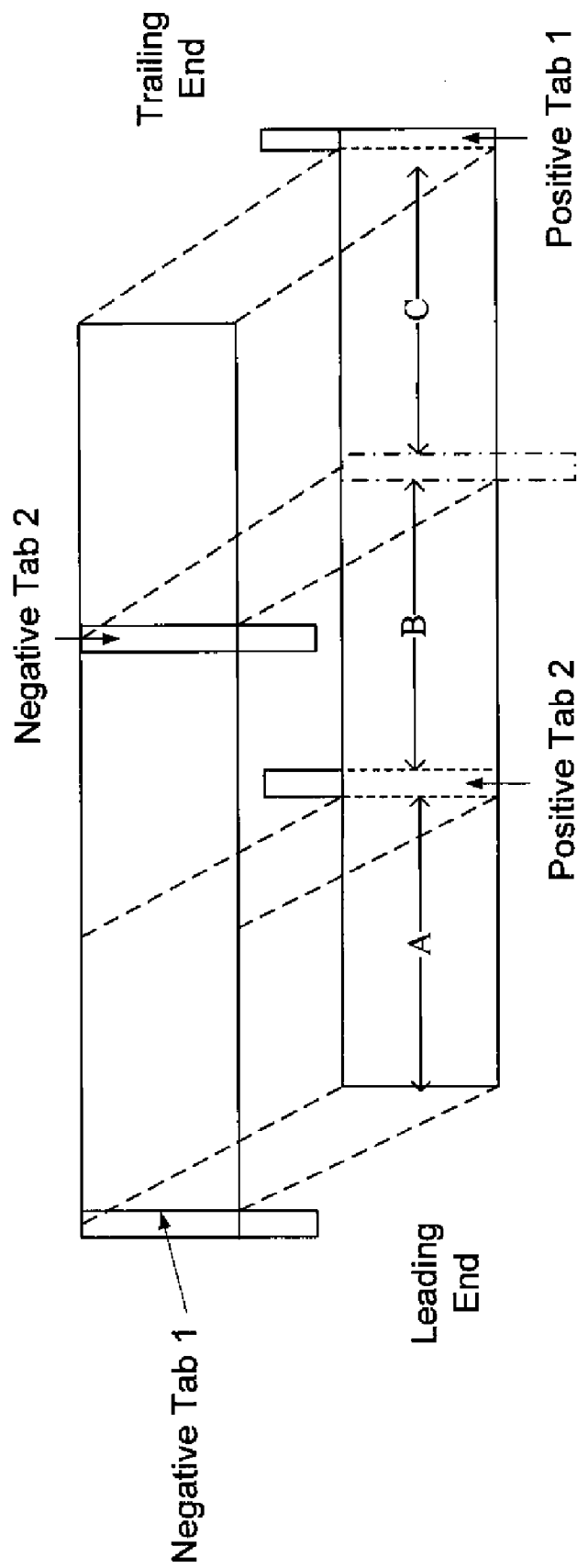
FIG. 6 shows a secondary battery including a pair of electrodes, where two tabs are connected to one of the current collectors, and two tabs are connected to the other current collector.

FIG. 6 shows one implementation where a secondary battery including a pair of electrodes, where two tabs are connected to one of the electrodes, and two tabs are connected to the other current electrode in accordance with another implementation of the invention. For example, two negative tabs may be connected to a negative electrode at the leading end of the negative electrode and ⅔ of the length from the leading end of the electrode while two positive tabs may be connected to a positive electrode so that they are at the trailing end of the positive electrode and ⅔ of the length from the trailing end of the positive electrode. The tabs may be arranged so that they are alternatingly evenly spaced between the negative and positive electrodes such that A=B=C.

Figure 7:
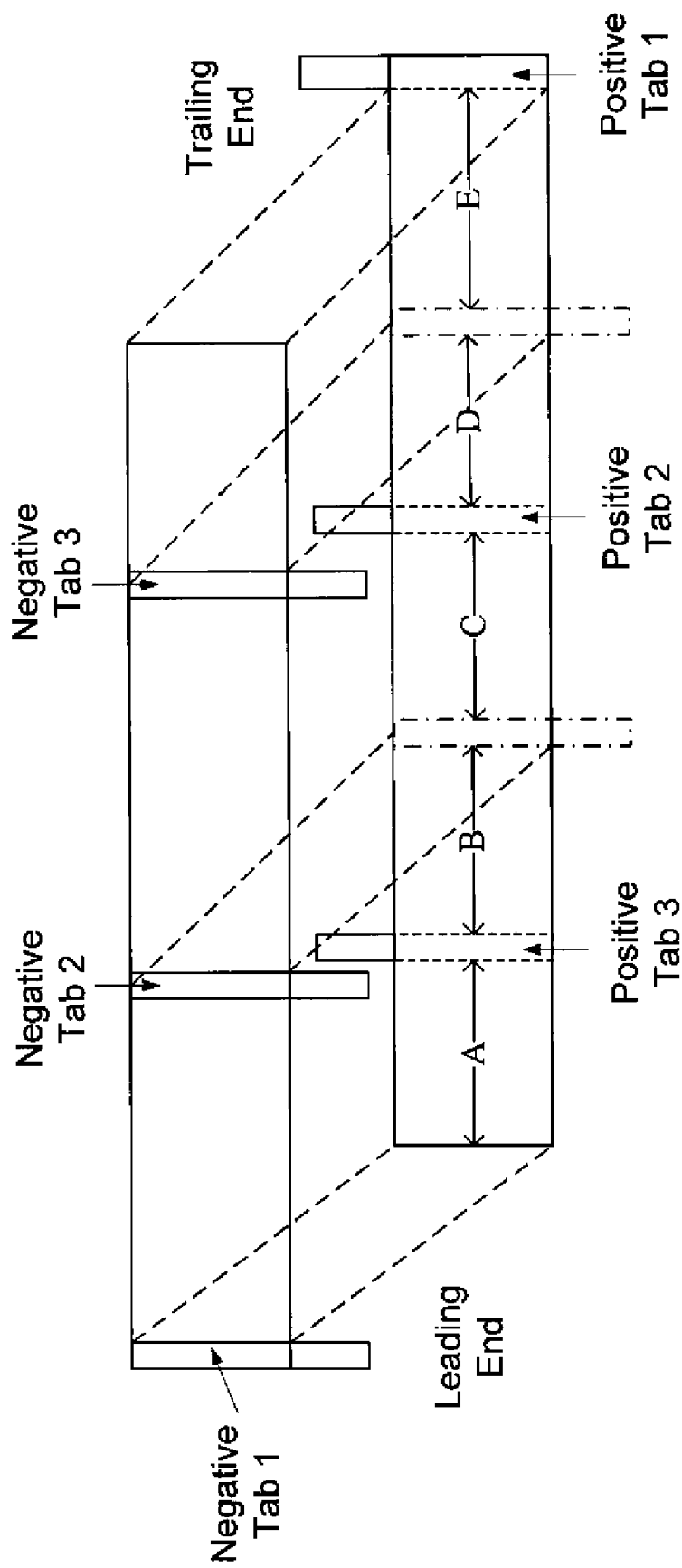
FIG. 7 shows a secondary battery including a pair of electrodes, where three tabs are connected to one of the current collectors, and three tabs are connected to the other current collector.

FIG. 7 shows another implementation where a secondary battery including a pair of electrodes, where three tabs are connected to one of the electrodes, and three tabs are connected to the other electrode in accordance with another implementation of the invention. For example, three negative tabs may be connected to a negative electrode at the leading end of the negative electrode, ⅖ of the length from the leading end of the electrode, and ⅘ of the length from the leading end of the electrode, while three positive tabs may be connected to a positive electrode so that they are at the trailing end of the positive electrode, ⅖ of the length from the trailing end of the positive electrode, and ⅘ of the length from the trailing end of the electrode. The tabs may be arranged so that they are alternatingly evenly spaced between the negative and positive electrodes such that A=B=C=D=E.

In another alternate embodiment of the invention, if a first electrodes has n number of tabs where n is any integer greater than 1, a second electrode may have m number of tabs where m is any integer less than or equal to n and greater than zero. For example, a pair of collector tabs may be connected to 6 tabs and 3 tabs respectively, 6 tabs and 2 tabs respectively, 8 tabs and four tabs respectively, and so forth.

The invention may provide a battery that can be formed of two or more electrodes with tabs. The electrodes may have a coating and may be arranged with separators in a number of different arrangements.

Figure 8:
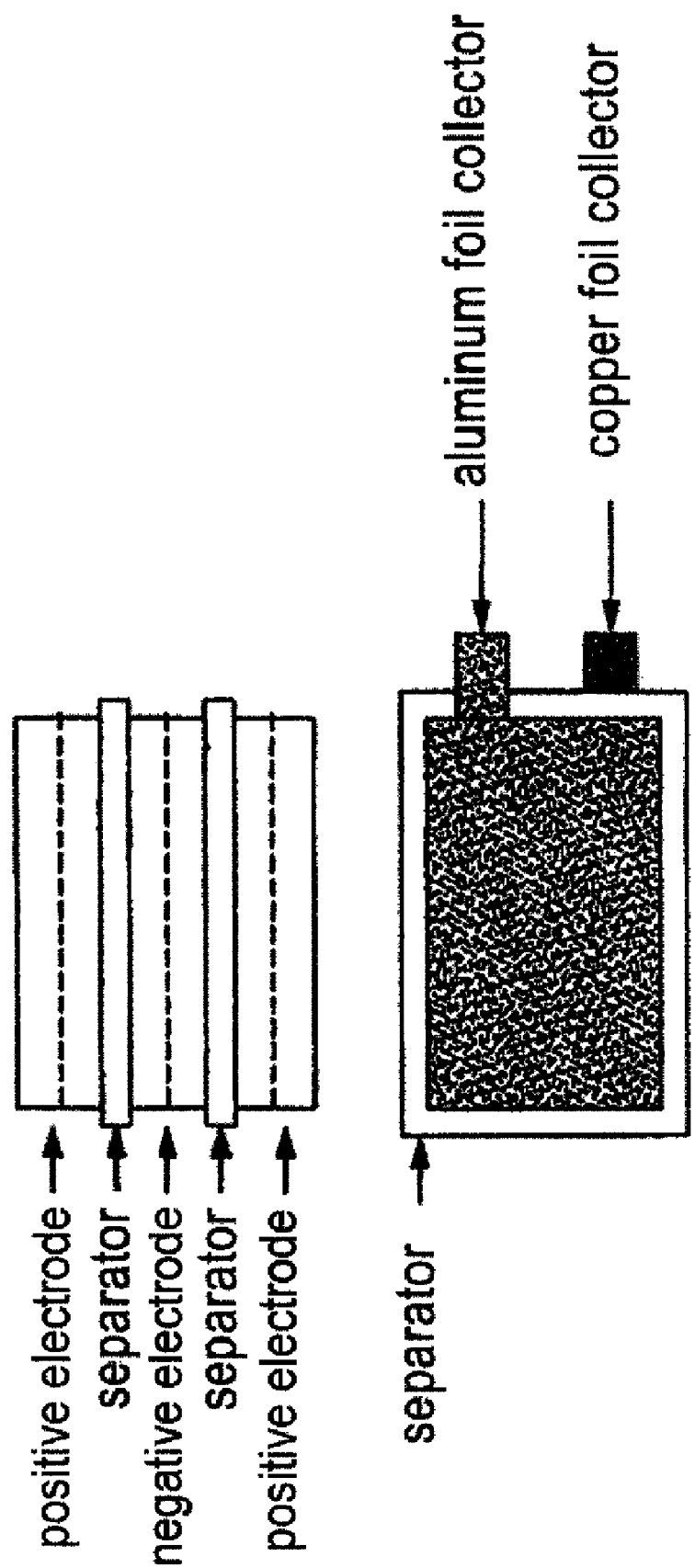
FIG. 8 shows an example of stacks of positive electrodes, negative electrodes and separators.
Figure 9:
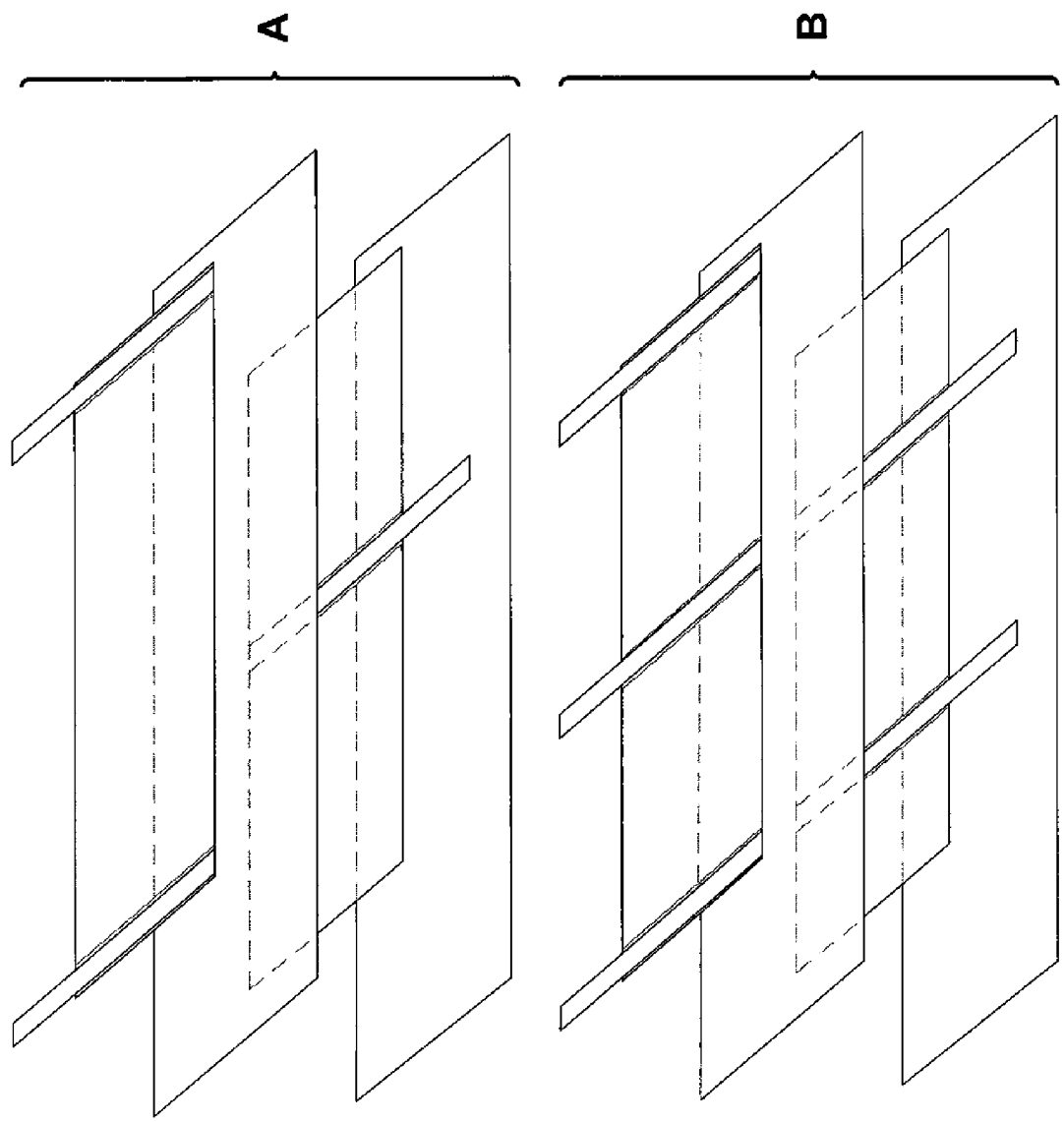
FIG. 9 shows examples of a stack of collector foils with tabs.

In some embodiments of the invention, a battery may be formed with a plurality of electrodes that are arranged in a stack. Such stacks may be arranged so that there can be alternating layers of a positive electrode with at least one tab, a separator, a negative electrode with at least one tab, another separator, and then repeating. FIG. 8 shows an example of stacked electrodes from the side and from the top. Such stacks of electrodes may incorporate any of the tab configurations and combinations thereof discussed herein. FIG. 9 shows examples A and B of electrodes with various tab configurations. Such electrodes may be arranged in a stack.

In some other embodiments, a band-shaped electrode can be laminated by winding itself spirally so that the side of the band-shaped electrode results in a flush wound end surface, in a jellyroll configuration to form a battery. Such bands may be of different dimensions such as lengths and thicknesses and heights, which may result in a battery in a jellyroll configuration of varying diameters. For instance, spiral-wound jellyroll batteries may have diameters ranging from 0.1 mm to 10 cm. Batteries may have diameters of approximately 0.1 mm, 1 mm, 5 mm, 10 mm, 17.4 mm, 26 mm, 31 mm, 41 mm, 50 mm, or 10 cm. In some embodiments of the invention, the jellyroll batteries may be circular in cross-section, or may be spirally wound with other cross-sections, such as ovals, rectangles, or any other shape. Spirally wound current collectors may incorporate any of the tab configurations and combinations thereof discussed herein. In some instances, a battery comprising a pair of current collector foils including a negative collector foil and a positive collector foil may have the pair of current collector foils rolled into an 18 mm diameter jellyroll configuration or a 25 to 26 mm diameter jellyroll configuration.

Figure 10A:
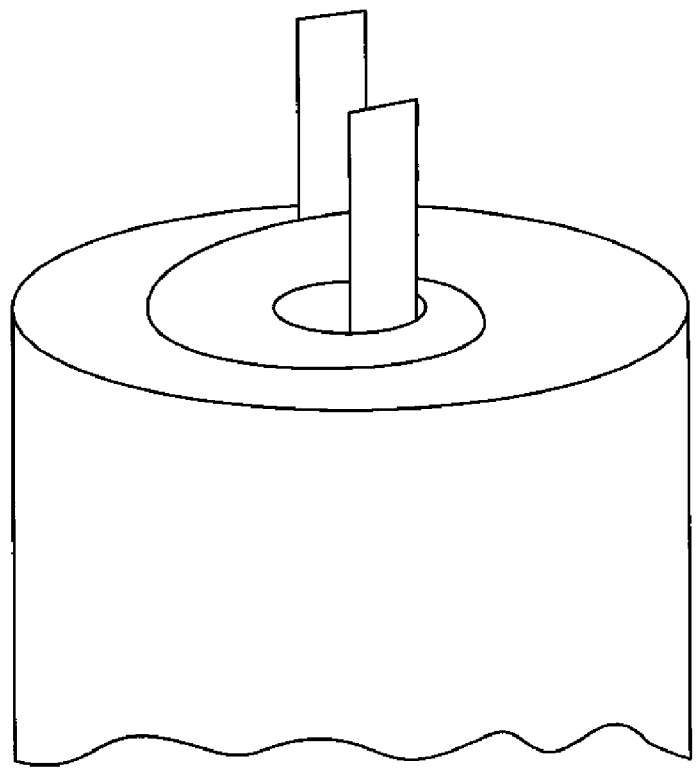
FIG. 10A and FIG. 10B show an example of a jellyroll configuration with two tabs on one collector foil and one tab on another collector foil.
Figure 10B:
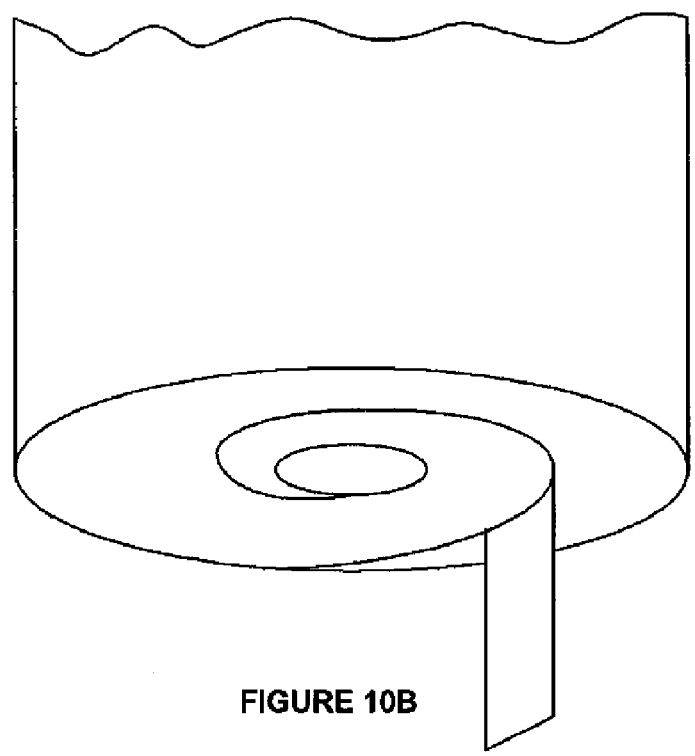
Figure 10C:
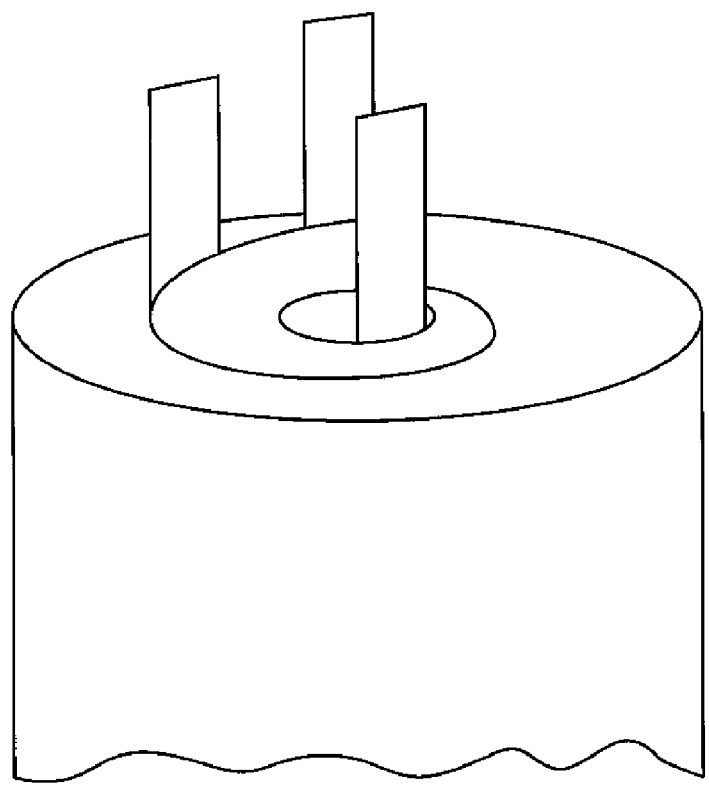
FIG. 10C and FIG. 10D show another example of a jellyroll configuration with three tabs on one collector foil and two tabs on another collector foil.
Figure 10D:
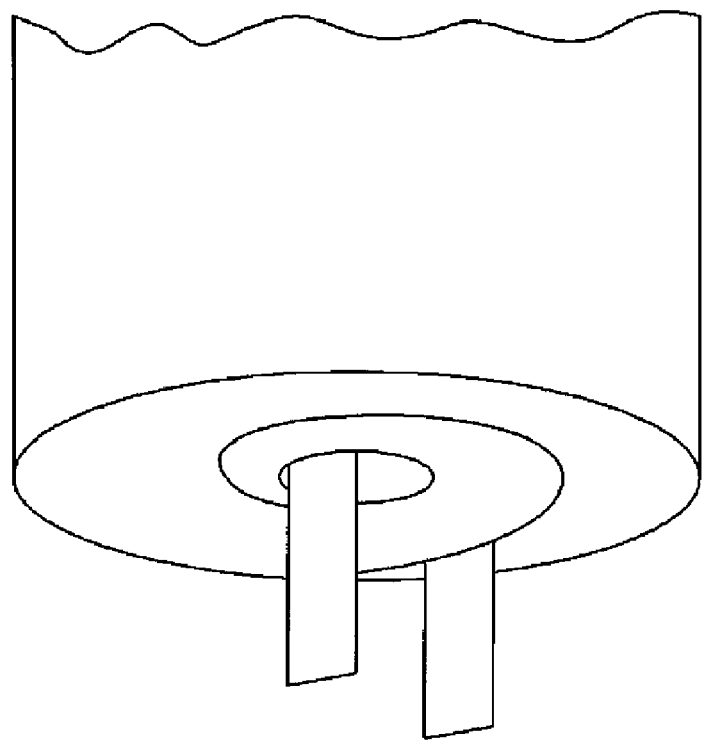

FIG. 10A and FIG. 10B show an example of a jellyroll configuration with two tabs on a first electrode and one tab on a second electrode, where the tabs on the first electrode protrude in one direction and the tab on the second electrode protrudes in another direction. FIG. 10C and FIG. 10D show another example of a jellyroll configuration with three tabs on a first electrode and two tabs on a second electrode, where the tabs on the first electrode protrude in one direction and the tabs on the second electrode protrude in another direction.

In some embodiments of the invention, the battery may be a rechargeable battery such as a lithium ion battery, a lithium polymer battery, a nickel cadmium battery, a nickel metal hydride battery, or a lead acid battery. In some instances, the battery may have a cylindrical cell format, or a prismatic cell format, such as a 18650 cylindrical cell format, 26650 cylindrical cell format, 31650 cylindrical cell format, or 633450 prismatic cell format.

As discussed previously, the current collector foil of a battery may have a number of shapes and sizes. For instance, the collector foil may be rectangular in shape and with a particular height, length, and thickness. Similarly, the collector foil may be band-shaped, which may be similar to a rectangle where the length far exceeds the height and thickness. Alternatively, the collector foil may have any shape or configuration that may allow it to function within a battery.

In some embodiments the collector foils may have various dimensions. A collector foil may be of any size that may enable it to function within a battery. In some embodiments, the positive and negative collector foils may have different heights. For instance, a positive foil collector may have a height of 54 mm while a negative foil collector may have a height of 56 mm. In alternate embodiments the positive and negative collector foils may have the same height.

In some embodiments the positive and negative collector foils may have different lengths. For instance, a positive collector foil may have a length of 600 mm, a negative collector foil may have a length of 632 mm. In alternate embodiments the positive and negative collector foils may have the same length. In some embodiments of the invention, the lengths of the positive and negative collector foils may be such that the electrodes can be spirally-wound to form a jellyroll configuration such that the jellyroll batteries may have various diameters, as discussed previously. Jellyroll diameters may also apply to spirally-wound electrodes with different cross-sectional shapes. For example, an elliptical jellyroll may have a minor diameter of 6 mm and a major diameter of 36 mm.

The separators may be of a size and shape to prevent the positive electrode and negative electrode from coming into contact with one another. For example, in a situation where the collector foils are rectangular in shape, the separators may also be rectangular in shape and may have sufficient dimensions to keep the electrode from coming into contact with one another. In another example, in a situation where the electrodes are a band shape, the separators may also be a band shape of sufficient dimensions to keep the electrodes from coming into contact. The separators may be of various thicknesses. For example, a separator may have a thickness that ranges from 5 $\mu$m to 100 $\mu$m, such as a thickness of approximately 5 $\mu$m, 10 $\mu$m, 20 $\mu$m, 25 $\mu$m, 30 $\mu$m, 40 $\mu$m, 70 $\mu$m, or 100 $\mu$m.

A battery may include a positive electrode and a negative electrode. One aspect of the invention provides positive and negative collector foils that may be selected such that the positive collector foil has a predetermined thickness and the negative collector foil has a predetermined thickness, which are then coated. The positive and negative collector foils may be formed with the predetermined thicknesses. A predetermined resistance of a cell may be provided as a function of the predetermined thicknesses of the positive and negative collector foils. In one embodiment, the function for determining the cell resistance may be such that the cell resistance is the sum of a current collector resistance and an electrochemical resistance.

A current collector resistance may be the resistance of current flow along a collector foil. A current collector resistance may depend on collector foil thicknesses. An electrochemical resistance may include the ohmic and non-ohmic impedance from various Faradaic and non-Faradaic processes in a battery cell. Such impedance may include solid phase conduction, inter-particle connection, electrolyte resistance, and the effect of concentration polarization. An electrochemical resistance may depend on collector foil thickness such that if a collector foil is too thick, a smaller length of the collector foil may fit within a given volume such as a cell can, and the electrode area may be small and the electrochemical resistance may be high. Increasing either current collector resistance or electrochemical resistance may increase the cell resistance and cause the current capability of an electrode to diminish, and the performance of a battery to suffer. The predetermined thicknesses of the collector foils may be selected so that the cell resistance may be minimized.

A positive electrode and a negative electrode may have an equal resistance for certain positive and negative collector foil thicknesses. For example, the collector foil resistance of a positive collector foil may equal the collector foil resistance of a negative collector foil for particular positive foil thicknesses and particular negative foil thicknesses. In some embodiments of the invention, the thickness of the positive foil and the thickness of the negative foil may have a relationship in order to yield equal resistances for the positive and negative electrodes.

In some implementations, the relationship may be linear, such that:

$$Y = a*X$$

wherein X is the positive collector foil thickness, and Y is the negative collector foil thickness. For example, a may fall within the range from approximately 0.1 to 10, 0.3 to 1.0, or 0.5 to 0.7. The value of a may vary depending on the collector foil materials selected. For example, in a preferable embodiment of the invention where the positive collector foil is aluminum and the negative collector foil is copper, a may be 0.6 such that Y=0.6*X.

As shown previously, FIG. 1 defines a set of coordinates for a collector foil. Also as discussed earlier for equations [1]-[5], when the dimensionless parameter λ is equal to 1, the expressions may be independent of the length of the collector foil and the current may therefore be uniform across the entire length of the collector. Having a uniform current across the length of an electrode could be an optimum case, especially for high currents since the most capacity can be extracted from the electrode. This can be controlled by the ratio of the positive electrode to negative electrode foil thicknesses, as shown in equation [5].

The distribution of current on the electrodes may be affected by design factors of the battery. A uniform current distribution may be desirable. The current distribution may be affected by battery design factors such as tab configurations, collector foil thickness, and electrode length for a given size cell. One particular tab configuration may be a single tab on each electrode, and the tabs may be at opposite ends of the electrodes. With this particular configuration, the process of battery design may involve deciding on loading and porosities of both electrodes and the thicknesses of the two collector foils. Once these are decided, the maximum length of the electrodes that can fit into a cell case can be calculated from the interior volume of the cell case. The choice of collector thicknesses may affect the length of the electrode and the area of the electrode, which in turn may affect the electrochemical impedance and other performance characteristics of the battery, such as the maximum current carrying capability.

One aspect of the invention may provide forming a battery with a customized cell resistance by selecting a positive collector foil with a first thickness and selecting a negative collector foil with a second thickness, where the first and second thicknesses of the positive and negative collector foils may be selected from a predetermined range to provide a customized total cell resistance or more uniform current density. The customized total cell resistance may be the predetermined resistance which may be the sum of the current collector resistance and the electrochemical resistance. In some cases, current collector resistance may be minimized when positive and negative collector foil thicknesses are chosen to make λ approach 1.

In some embodiments, the customized cell resistance may be determined by looking at the relationship between the customized cell resistance and the positive and negative collector foil thicknesses. Any positive collector foil thickness and negative collector foil thickness may be selected in order to yield a desired customized cell resistance. In some embodiments the desired customized cell resistance is the minimized cell resistance for positive and negative electrodes with particular properties.

EXAMPLES

Example 1

For a group of cells, the positive collector was aluminum foil. The height of the positive collector was 54 mm, the thickness was 27 μm, and the resistivity $\rho_{Al}$ was $2.82 \times 10^{-6}$ ohm cm. The negative collector was copper foil. The height of the negative collector was 56 mm, the thickness was 16 μm, and the resistivity $\rho_{Cu}$ was $1.72 \times 10^{-6}$ ohm cm. The λ, as defined in equation [4], was 0.98. The positive collector was coated with an active material that contained 87.5% $LiCoO_2$ (144 mAh/g reversible, d=5.05 $g/cm^3$), 5% carbon black (d=1.90 $g/cm^3$), and 7.5% PVDF (d=1.73 $g/cm^3$) by weight. The positive electrode with the coating had a 39% porosity and 15.4 $mg/cm^2$ loading. The positive electrode had a height of 54 mm. The negative foil collector was coated with an active material that contained 91% graphite (320 mAh/g reversible, d=2.22 $g/cm^3$), 2% carbon black (0 mAh/g reversible, d=1.90 $g/cm^3$), and 7% PVDF (d=1.73 $g/cm^3$) by weight. The negative electrode with the coating had a 44% porosity and 6.84 $mg/cm^2$ loading. The negative electrode had a height of 56 nm. The separator was 25 μm thick. The electrodes and the separators were spirally-wound into a jellyroll configuration with an inner diameter of 3 mm and an outer diameter of 17.4 mm. The jellyroll was inserted into a cell case. The tabs were welded to the terminals. The cell case was filled with 7.5 g of electrolyte containing 1.2 M $LiPF_6$ in EC/EMC (3:7 by weight). The cell was sealed.

The cell underwent 10 second DC discharge pulse test conditions. The test conditions included ten second pulses at a given current followed by 120 seconds of rest between each pulse until voltage on discharge reaches 2.5V. The number of pulses was used as an indication of the cell performance. Eight cells in the group were tested with each of the following pulse current and power settings: 30 A, 20 A, 1800 W/kg, 1200 W/kg and 600 W/kg. Each high-drain test of 30 A, 20 A and 1800 W/kg used two cells and each moderate-drain test of 600 W/kg and 1200 W/kg used one cell. Table 1 lists the results of the number or the average number of pulses.

TABLE 1

| Designation | Cu Foil Thickness | Al Foil Thickness | λ | 30 A # of pulses | 20 A # of pulses | 1800 W/kg # of pulses | 1200 W/kg # of pulses | 600 W/kg # of pulses |
|---|---|---|---|---|---|---|---|---|
| Example 1 | 16 | 27 | 0.98 | 11.75 | 18.8 | 14.5 | 25.4 | 55.4 |
| Example 2 | 20 | 40 | 1.16 | 10.9 | 17.8 | 13.9 | 23.4 | 49.6 |
| Example 3 | 20 | 27 | 0.78 | 9.68 | 15.8 | — | — | — |

Example 2

For a group of cells, the positive collector was aluminum foil. The positive collector height was 54 mm, the thickness was 40 μm, and the resistivity $\rho_{Al}$ was $2.82 \times 10^{-6}$ ohm cm. The negative collector was copper foil. The negative collector height was 56 mm, the thickness was 20 μm, and the resistivity $\rho_{Cu}$ was $1.72\times10^{-6}$ ohm cm. The $\lambda$, as defined in equation [4], was 1.16. The positive collector was coated with an active material that contained 87.5% $LiCoO_2$ (144 mAh/g reversible, d=5.05 g/cm$^3$), 5% carbon black (d=1.90 g/cm$^3$), and 7.5% PVDF (d=1.73 g/cm$^3$) by weight. The positive electrode with the coating had a 38.4% porosity and 15.4 mg/cm$^2$ loading. The positive electrode had a height of 54 mm. The negative foil collector was coated with an active material that contained 91% graphite (320 mAh/g reversible, d=2.22 g/cm$^3$), 2% carbon black (0 mAh/g reversible, d=1.90 g/cm$^3$), and 7% PVDF (d=1.73 g/cm$^3$) by weight. The negative electrode with the coating had a 45.8% porosity and 5.9 mg/cm$^2$ loading. The negative electrode had a height of 56 mm. The separator was 25 μm thick. The electrodes and the separators were spirally-wound into a jellyroll configuration with an inner diameter of 3 mm and an outer diameter of 17.4 mm. The jellyroll was inserted into a cell case. The tabs were welded to the terminals. The cell case was filled with 7.46 g of electrolyte containing 1.2 M $LiPF_6$ in EC/EMC (3:7 by weight). The cell was sealed.

The cell underwent 10 second DC discharge pulse test conditions. The test conditions included ten second pulses at a given current followed by 120 seconds of rest between each pulse until voltage on discharge reaches 2.5V. The number of pulses was used as an indication of the cell performance. Nine cells in the group were tested with each of the following pulse current and power settings: 30 A, 20 A, 1800 W/kg, 1200 W/kg and 600 W/kg. Each high-drain test of 30 A, 20 A, 1200 W/kg and 1800 W/kg used two cells and the moderate-drain test of 600 W/kg used one cell. Table 1 lists the results of the number or the average number of pulses. The 30 A pulse test used 5 cells and the 20 A pulse test used two cells. Table 1 lists the results of the number or the average number of pulses.

Example 3

For a group of cells, the positive collector was aluminum foil. The positive collector height was 54 mm, the thickness was 40 μm, and the resistivity $\rho_{Al}$ was $2.82\times10^{-6}$ ohm cm. The negative collector was copper foil. The negative collector height was 56 mm, the thickness was 20 μm, and the resistivity $\rho_{Cu}$ was $1.72\times10^{-6}$ ohm cm. The $\lambda$, as defined in equation [4], was 0.78. The positive collector was coated with an active material that contained 87.5% $LiCoO_2$ (144 mAh/g reversible, d=5.05 g/cm$^3$), 5% carbon black (d=1.90 g/cm$^3$), and 7.5% PVDF (d=1.73 g/cm$^3$) by weight. The positive electrode with the coating had a 40% porosity and 15.0 mg/cm$^2$ loading. The positive electrode had a height of 54 mm. The negative foil collector was coated with an active material that contained 91% graphite (320 mAh/g reversible, d=2.22 g/cm$^3$), 2% carbon black (0 mAh/g reversible, d=1.90 g/cm$^3$), and 7% PVDF (d=1.73 g/cm$^3$) by weight. The negative electrode with the coating had a 45% porosity and 5.8 mg/cm$^2$ loading. The negative electrode had a height of 56 mm. The separator was 25 μm thick. The electrodes and the separators were spirally-wound into a jellyroll configuration with an inner diameter of 3 mm and an outer diameter of 17.4 mm. The jellyroll was inserted into a cell case. The tabs were welded to the terminals. The cell case was filled with 8.15 g of electrolyte containing 1.2 M $LiPF_6$ in EC/EMC (3:7 by weight). The cell was sealed.

The cell underwent 10 second DC discharge pulse test conditions. The test conditions included ten second pulses at a given current followed by 120 seconds of rest between each pulse until voltage on discharge reaches 2.5V. The number of pulses was used as an indication of the cell performance. Seven cells in the group were tested with each of the following pulse current and power settings: 30 A and 20 A. The 30 A pulse test used five cells and the 20 A pulse test used two cells. Table 1 lists the results of the average number of pulses.

As discussed previously, when $\lambda$ is equal to one, the current may be as uniform as possible across the length of a collector. A cell where the $\lambda$'s approach as close to 1 as possible may be preferable, especially for high currents, which the most capacity may be extracted from the electrode. The collector foil thicknesses may be selected to optimize $\lambda$.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A battery comprising:
   a pair of current collector foils including a negative collector foil and a positive collector foil each formed with a respective height (h); and
   a plurality of tabs electrically connected to the negative collector foil and a plurality of tabs electrically connected to the positive collector foil, wherein the plurality of tabs are formed with a length (t) and protruding from the negative and positive collector foils,
   wherein one of the pair of current collector foils is formed with three (3) tabs and the other of the current collector foil is formed with two (2) tabs.

2. The battery of claim 1 wherein the length (t) of the tabs is greater than the height (h) of the pair of current collector foils.

3. The battery of claim 1 wherein the negative collector foil is formed with copper.

4. The battery of claim 1 wherein the positive collector foil is formed with aluminum.

5. The battery of claim 1 wherein the tabs from one of the collector foils are protruding in the opposite direction from the tabs from the other collector foil.

6. The battery of claim 1 wherein the pair of current collector foils is rolled into an 18 mm diameter jellyroll configuration.

7. The battery of claim 1 wherein the pair of current collector foils is rolled into a 25 to 26 mm diameter jellyroll configuration.

8. The battery of claim 1 wherein the pair of current collector foils is rolled into a 31 mm diameter jellyroll configuration.

9. The battery of claim 1 wherein the pair of current collector foils is rolled into a 41 mm diameter jellyroll configuration.

10. The battery of claim 1 wherein the pair of current collector foils is rolled into a cylindrical jellyroll configuration within a 18650 cell.

11. The battery of claim 1 wherein the pair of current collector foils is rolled into an elliptic jellyroll configuration within a 633450 prismatic cell.

12. The battery of claim 1 wherein the of current collector foils further comprises at least one separator between the pair of current collector foils.

13. The battery of claim 1 wherein a plurality of the pairs of current collector foils are arranged in a stack.

14. The battery of claim 1 wherein at least one of the pair of current collector foils further comprises at least one coating including an active material.

* * * * *